United States Patent [19]
Nitzberg

[11] Patent Number: 5,285,807
[45] Date of Patent: Feb. 15, 1994

[54] COUPLING SYSTEM

[76] Inventor: Leonard R. Nitzberg, 1413 Buckeye La., Knoxville, Tenn. 37919

[21] Appl. No.: 767,079

[22] Filed: Sep. 27, 1991

[51] Int. Cl.$^5$ ............................................. F16K 17/14
[52] U.S. Cl. ........................... 137/68.1; 285/321; 141/302; 137/614.04
[58] Field of Search ................. 137/68.1, 70, 614.04; 285/321; 251/214; 141/302

[56] References Cited

U.S. PATENT DOCUMENTS

| | | | |
|---|---|---|---|
| 4,465,096 | 8/1984 | Voisine | 285/321 X |
| 4,614,201 | 9/1986 | King et al. | 137/68.1 |
| 4,804,206 | 2/1989 | Wood et al. | 285/321 X |
| 4,827,960 | 5/1989 | Nitzberg et al. | 137/68.1 |
| 4,872,710 | 10/1989 | Konecny et al. | 285/321 X |

Primary Examiner—Martin P. Schwadron
Assistant Examiner—Kevin L. Lee
Attorney, Agent, or Firm—Judy Winegar Goans

[57] ABSTRACT

A quickly-disconnecting coupling suitable for use in a fuel dispensing system reduces fluid pressure-generated axial separation forces on the coupling. A first body member has one or more fluid passages therethrough in fluid communication with corresponding fluid passages through a second body member. A detent is provided to couple the body members to each other in flow communication and to uncouple them when a force in excess of a predetermined level is exerted on the coupling. The detent may be frangible or infrangible. Means are provided to hold the first and second body members in axial juxtaposition with each other. Valving is provided for sealing fluid passages against loss of fluid when the detent releases the first and second body members from axial juxtaposition. A hydraulic seal is so located as to prevent the pressurized liquid contained in the fluid passages from entering between the first and second body members at the axial interface thereof, thus limiting fluid pressure-generated damage to coupling, including effects of line shock. A recouplable detent is also provided which has a spring with a contacting edge, a first annular recess in a first body member, a second annular recess in a second body member, the first annular recess being aligned with the second annular recess and the second body member having a camming surface. In the coupled position, the spring is located within the second annular recess with the contacting edge in contact with the camming surface.

11 Claims, 4 Drawing Sheets

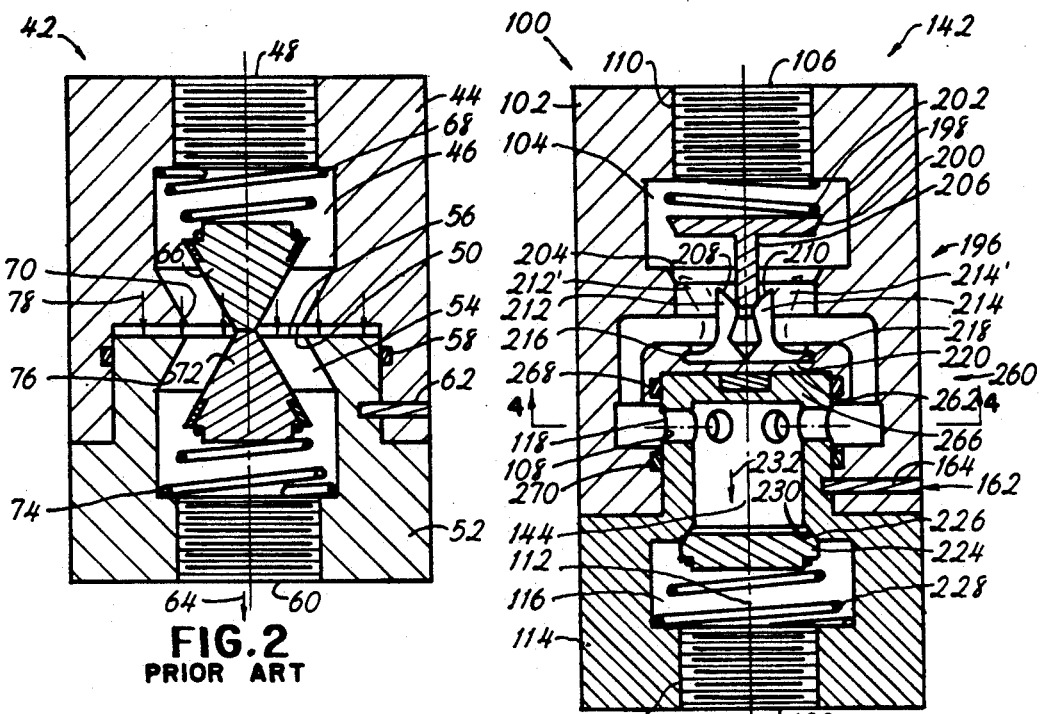
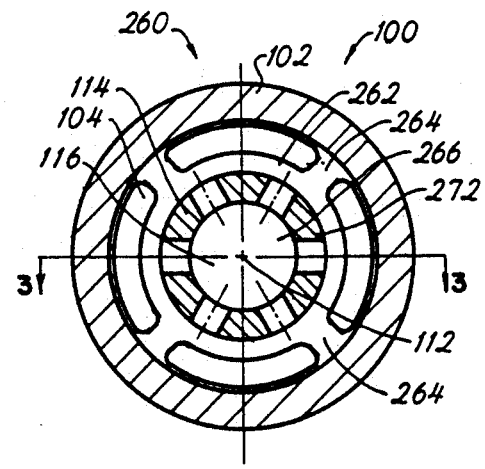
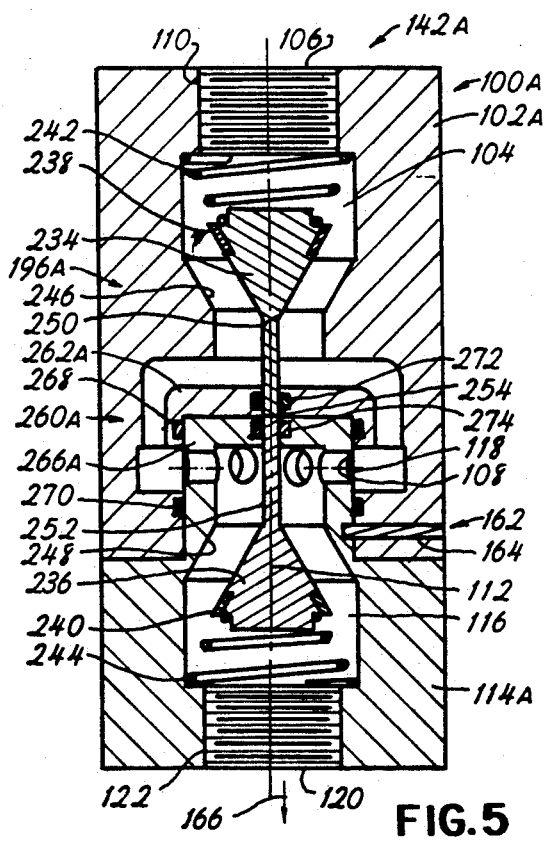
FIG. 2 PRIOR ART
FIG. 3
FIG. 4
FIG. 5

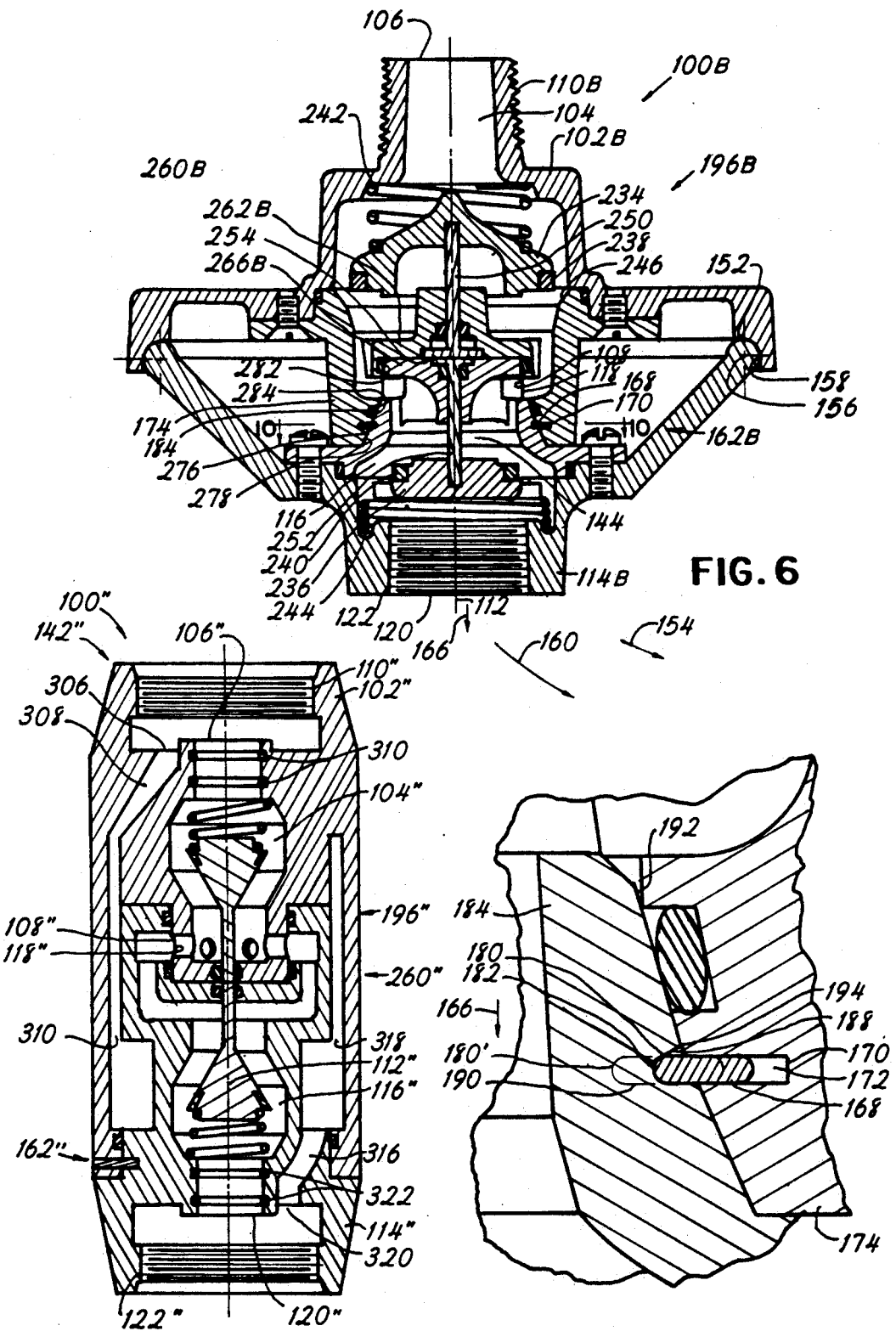

COUPLING SYSTEM

BACKGROUND OF THE INVENTION

This invention relates to a coupling or connector for disconnecting and shutting off the flow of liquid through the line in which the coupling is placed, and more particularly to a quickly disconnecting connector suitable for use as an emergency breakaway fitting in lines carrying flammable or combustible fluids such as fuel. It is desirable for a breakaway coupling in a fuel line to disconnect at a relatively low tensile force in order to limit damage to the fuel dispensing system, but the force at which a coupling disconnects must also be great enough to withstand axial separation forces on the coupling as a result of fluid pressure. This invention relates to a coupling system that reduces the axial separation forces due to fluid pressure, permitting the use of couplings that separate at a lower externally-generated tensile force.

Fuel, such as gasoline, is commonly dispensed from a fuel pump through a flexible hose and nozzle into the tank of a vehicle such as an automobile or boat. Safety requirements typically provide that controls on the dispenser must be manually activated but must cut off automatically. When the desired amount of fuel has been dispensed, the individual operating the pump removes the nozzle from the fuel tank, turns off the pumping equipment and replaces the nozzle on the dispenser. FIG. 1 illustrates such a system. Occasionally, a vehicle may be driven from the proximity of the dispensing station without first removing the nozzle from the fuel tank inlet. A large number of such occurrences, presently more than 300,000 each year, are reported annually. Instances of this kind are referred to in the trade as a "drive off". Safety regulations require a safety release mechanism with an automatic cut off to terminate flow on such equipment. Without such a mechanism that functions properly, when a drive off occurs, forces generated at the nozzle 34 and transmitted through the hose could dislodge and damage measuring equipment 12 and piping 22 in the pump assembly and could in some cases even dislodge the pump assembly, which is typically anchored to a concrete platform. When such damage occurs, the highly-combustible fuel may be spilled, posing fire and environmental hazards.

Various coupling devices have been developed which are suitable for releasing the nozzle 34 from the pump assembly when the coupling device is subjected to tensile forces above a specified threshold level. The devices, called breakaway couplings or breakaways, are intended to prevent the damage associated with a drive-off. When the nozzle is disconnected, fluid passages in these devices are closed to prevent loss of fuel. Safety regulations in the United States require such a releasing mechanism.

FIG. 2 shows a basic fuel line coupling device with separable body members 44 and 52 held together by a detent 62. These features are common to a number of different breakaway couplings that may vary in the form of detent, body members, valving, or the method of attachment or insertion into the system. For example, the breakaway may offer multiple fluid passages not shown here. The device of FIG. 2 is presented as a representative device to illustrate certain problems common to many different breakaway couplings.

In this class of couplings, tensile force directed along the longitudinal axis 64 of the coupling device (i.e., along the direction of fluid flow) will cause the detent to release the two members of the coupling device, and valves 66 and 72 will then cut off fluid flow through the coupling. The threshhold level at which the detent must release must be sufficiently low to prevent damage to the fuel dispensing system, which typically includes a pump and an underground storage system, not illustrated. Since cabinet anchors may fail at less than 250 pounds and hose connections separate at less than 300 pounds, the breakaway should ideally separate at a lower tensile force.

In the United States, safety rules permit the release mechanism to separate under tensile forces in excess of 200 pounds if the device is properly tested on the specific equipment with which it will be used, while in certain European nations the release mechanism must operate at less than 30 kilograms (approximately 67 pounds) of tensile force.

Some breakaway couplings, like the devices described in U.S. Pat. Nos. 4,667,883, 4,828,183 and 4,827,977, are suitable for mounting between hose segments 24 at some convenient location 40. Other breakaway couplings, such as the devices described in U.S. Pat. No. 4,899,792 and the device shown in FIG. 6 of U.S. Pat. No. 4,667,883 are suitable for use as swivel joint connectors 36. Still other breakaway couplings, such as the devices described in pending U.S. patent applications Ser. Nos. 07/597,886 and 07/597,890 are suitable for mounting directly between the hose and the anchored piping 22. These devices typically rely on some type of detent mechanism for separation.

Looking in more detail at FIG. 2, the first body member 44 is suitable for attachment to the anchored piping system 22 by some convenient means. The first body member 44 includes a fluid passage 46 therethrough from an inlet 48, suitable for being held in fluid communication by some means with the anchored piping 22, to an outlet 50. The first body member 44 is suitable for receiving a corresponding second body member 52, which includes a fluid passage 54 therethrough from an inlet 56, juxtapositioned in fluid communication with the outlet 50 of first body member 44 f by some sealing means 58, to an outlet 60 suitable for being held in fluid communication by some means with the nozzle 34. The outlet 50 of first body member 44 is held in fluid communication with the inlet 56 of second body member 52 by a detent 62 which may be either a frangible member such as the shear pin device of U.S. Pat. No. 4,667,883 or a recouplable member such as is shown in U.S. Pat. No. 4,827,977. When a force, either axially directed or axially redirected, in excess of a predetermined threshold, is exerted in direction 64, the detent 62 releases the second body member 52 from the first body member 44 thereby releasing the anchored piping 22 from the nozzle 34 and allowing the inlet 56 of second body member 52 to move from fluid communication with the outlet 50 of first body member 44. As this occurs, valve 66, urged by some means 68, moves into sealing contact with valve seat 70 in first body member 44 to seal the passage from the metering device 12 thereby preventing discharge of pressurized fluid, while valve 72, urged by some means 74, moves into sealing contact with valve seat 76 in second body member 52 to seal the passage from the nozzle 34 and preventing discharge of fluid contained therebetween in excess of the legally mandated maximum loss per separation, which in the United States may be as little as one (1) pint.

While the breakaway coupling is designed to separate under certain conditions, its attachment mechanism should not fail during normal operation when there is no externally-generated tensile force applied to the system. The coupling must therefore withstand axial separation forces that exist in normal operation.

Hydrostatic pressure within the coupled device generates a force between the first body member 44 and second body member 52 at the pressurized interface of the two body members. This force tends to move the second body member 52 axially in direction 78. These hydrostatically produced axial forces therefore act in the same direction as the externally-generated tensile forces, are cumulative, and are restrained solely by the detent 62.

The magnitude of such hydrostatically produced axial forces is relatively large for some breakaways. The hydrostatic forces are the product of the area under pressure and the hydrostatic pressure on that area. The area under pressure within the breakaway is defined and limited by the sealing means 58 which, typically varies from 0.75 inches in diameter to 1.25 inches in diameter. The area under pressure is thus typically in the range of approximately 0.44 square inches to more than 1.56 square inches. In the United States, the maximum normal pumping pressure for fuel dispensing equipment is limited to 50 pounds per square inch guage pressure (Psig.), producing an axial force of between approximately 22 pounds and 78 pounds. This force is small enough that it does not materially affect the ability of equipment to function as planned, but it increases the load on the detent both when it is and when it is not subject to externally-generated tensile force. Thus, one object of the present invention is to reduce the hydrostatically-produced axial separation force on the body members.

Another set of axial separation forces arise in normal operation of a system such as that illustrated in FIG. 1. When the trigger 38 of nozzle 34 is released suddenly, as commonly occurs in fuel dispensing, the column of liquid flowing from a remote location, which may be hundreds of feet distant, and moving at speeds of up to 160 feet per second, is suddenly stopped at the manually operated valve within the nozzle 34. This momentarily pressurizes the confined liquid, producing a pressure wave generally referred to as a Tine shock, which commences at the nozzle and moves through the piping to the remotely located pump. The line shock duration is only milliseconds, but it produces momentary pressures of up to 600 Psig. This momentary 600 Psig. line shock pressure applied to the sealing means produces momentary axial loading on the detent 62 in the range of approximately 220 pounds to 780 pounds of axial force. This is more than the ideal threshold limit of the devices. Since such loading is only momentary, complete failure of the detent does not normally occur after a single line shock but generally does occur after a succession of such shocks.

Accordingly, means are provided for diminishing or removing the axial effect of line shock at pressure-communicating interfaces of breakaway couplings. Several embodiments of the means are given and generally indicated at 100 in FIGS. 3 and 4, 100A in FIG. 5, 100B in FIG. 6, 100C in FIG. 8, 100D in FIG. 11, and 100E in FIG. 12.

BRIEF DESCRIPTION OF THE DRAWINGS

FIG. 2 shows a cross-sectional view of a typical breakaway coupling.

FIG. 3 shows an axial cross-sectional view of one embodiment of the improved breakaway coupling.

FIG. 4 shows a cross-section of the breakaway coupling embodiment shown in FIG. 3, the section being perpendicular to the axis and taken as shown in FIG. 3.

FIG. 5 shows an axial cross-section of another embodiment of the improved breakaway coupling.

FIG. 6 shows an axial cross-section of another embodiment of the improved breakaway coupling.

FIG. 9 is an enlarged segment of an axial cross-section of the embodiment shown in FIG. 6.

FIG. 11 is an axial cross-sectional view of another embodiment of the improved breakaway coupling.

DESCRIPTION OF THE INVENTION

Figure 1:
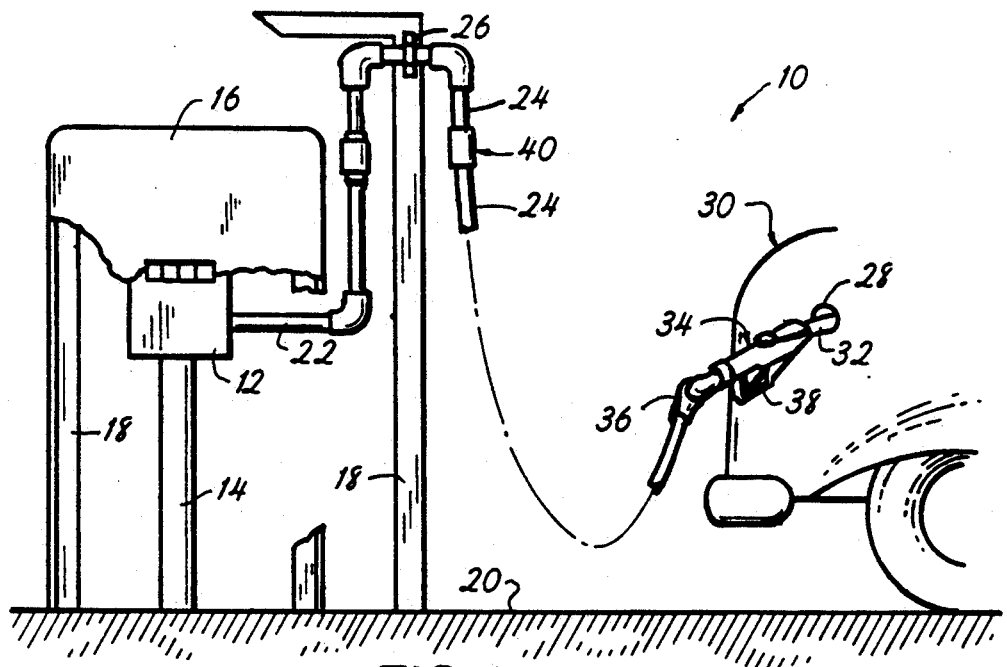
FIG. 1 shows a cutaway view of a fuel dispensing system.

Referring to the drawings, the apparatus includes a first body member 102, 102A, 102B or 102C describing a fluid passage 104 therethrough from an inlet 106 to an outlet 108. The inlet 106 is adapted by conventional means such as threading 110 or 110B to be attachable to the anchored piping 22 of the dispenser and held in fluid communication therewith, either directly or by means of one or more intermediate members such as a flexible hose segment 24. The threads may be male, as shown at 110B or female as shown at 110. The outlet 108 of the fluid passage 104 is positioned to discharge the fluid conveyed by the fluid passage 104 to the interface of an axially juxtapositioned corresponding member at some angle to the axis 112 of juxtapositioning and at a location other than the axial terminus of said interface.

A second body member 114, 114A, 114B or 114C is provided suitable for being axially juxtapositioned with the first body member 102, 102A, 102B or 102C along axis 112, which is the axis of engagement. The second body member 114, 114A, 114B or 114C describes a fluid passage 116 therethrough from an inlet 118 to an outlet 120. The inlet 118 is juxtapositioned in fluid communication with the outlet 108 of the fluid passage 104 of the first body member 102, 102A, 102B or 102C. The inlet 118 of the fluid passage 116 is positioned to receive the fluid discharged by said outlet 108 at some angle to the axis 112 of juxtapositioned and at a location other than the axial terminus of the interface between the first body member 102, 102A, 102B or 102C and the second body member 114, 114A, 114B or 114C. The outlet 120 of fluid passage 116 is adapted by conventional means such as threading 122 or 122C to be attachable to the nozzle 34 and held in fluid communication therewith, either directly or by means of one or more intermediate members such as a flexible hose segment 24. This therefore provides an axial engagement means for juxtapositioning body members, having a fluid passage therethrough, in fluid communication, said body members being connected intermediate a piping system and a nozzle and attachable thereto and held thereby in fluid communication therewith.

Figure 8:
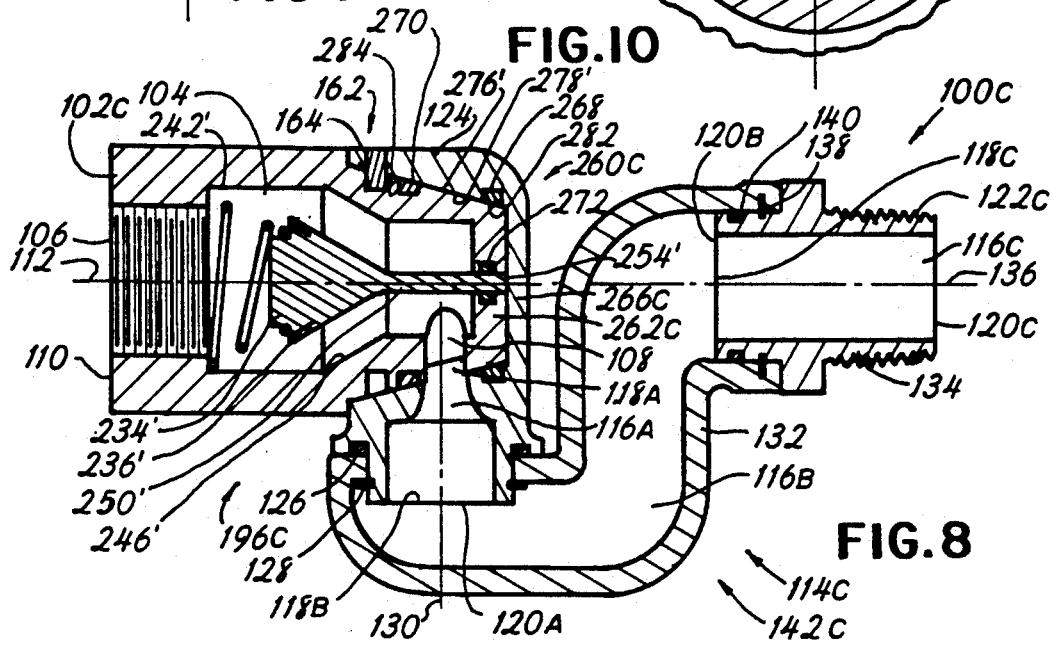
FIG. 8 shows an axial cross-sectional view of another embodiment of the improved breakaway coupling.

In one embodiment, depicted in FIG. 8, the second body member generally indicated at 114C comprises a swivel mechanism suitable for interconnection between a flexible hose and a nozzle. In the preferred embodiment of the swivel mechanism, the second body member 114C comprises a receiving member 124 suitable for being axially juxtapositioned with the first body member 102C along axis 112 which is the axis of engagement. The receiving member 124 describes a fluid passage 116A therethrough from an inlet 118A to an outlet 120A. The inlet 118A of the fluid passage 116A is positioned to receive the fluid discharged by said outlet 108 at some angle to the axis 112 of juxtapositioning and at a location other than the axial terminus of the interface between the first body member 102C and the receiving member 124. The outlet 120A of fluid passage 116A is adapted by conventional means such as an "O" ring seal 126 and a conventional retaining ring 128 to be hingedly attached at axis 130 to a yoking member 132 and held in fluid communication thereto.

The yoking member 132 portion of the second body member 114C is provided suitable for being flexingly held to the receiving member 124 along axis 130. The yoking member 132 describes a diverted fluid passage 116B therethrough from an inlet 118B to an outlet 120B. The inlet 118B is juxtapositioned in fluid communication with the outlet 120A of the fluid passage 116A of the receiving member 124. The outlet 120B of fluid passage 116B is adapted to discharge fluid to a connecting member 134.

A connecting member 134 portion of the second body member 114C is provided suitable for being rotatively juxtapositioned with the yoking member 132 along axis 136 and held thereto by a conventional retaining ring 138. The connecting member 134 describes a fluid passage 116C therethrough from an inlet 118C to an outlet 120C. The inlet 118C is juxtapositioned in fluid communication with the outlet. The outlet 120C of fluid passage 116C is adapted by conventional means such as threading 122C to be attachable to the nozzle 34 and held in fluid communication therewith, either directly or by means of one or more intermediate members such as conventional piping fittings.

Alignment means, generally indicated at 142 in FIG. 3 and 142A in FIGS. 5, 142B in FIG. 6 and 142C in FIG. 8, are provided to align the axis of juxtapostioning 112 with the direction of tensile pull at the point at which the first body member 102, 102A, 102B or 102C is releasably held to the second body member 114, 114A, 114B or 114C. The varieties of alignment means 142 or 142A, 142B and 142C are necessitated by variations in the arrangement of inlets 106 or 106B and the outlets 120 or 120C together with alterations in the general configuration of the devices, such variations being suitable for producing alignment of the axis of juxtapositioning 112 in response to a tensile force generated at the nozzle 34 during a drive-off and acting between the nozzle 34 and anchored piping 22. These thus varied alignment means are suitable for use at various positions in the connection between the nozzle 34, flexible hose or hose segments 24 and the anchored piping 22.

More specifically, an alignment means 142 in FIG. 3 or 142A in FIG. 5 is provided for aligning the axis of juxtapositioning 112 of breakaway coupling devices included between hose segments 24 at position 40 in FIG. 1. In the preferred embodiment, the first body member 102 or 102A includes an inlet 106 with a female thread 110. The juxtapositioned second body 114 or 114A also includes a female thread 122 at the outlet 120. The thus threaded inlet 106 and outlet 120 are suitable for being attached in fluid communication with a standard flexible hose segment 24. The flexible hose segment 24, attached at one end to the inlet 106, is affixed to the anchored piping 22 at the other end, thereby attaching the inlet 106 to the anchored piping 22. The flexible hose segment 24 attached at one end to the outlet 120 is affixed to the nozzle 34 at the other end, thereby attaching the outlet 120 to the nozzle 34. Further, the inlet 106 and outlet 120 are located generally along the axis of juxtapositioning 112 in such a manner that during a drive-off the tensile force transmitted by the flexible hose segments 24 between nozzle 34 and the anchored piping 22 produces alignment of the axis of juxtapositioning 112 with such tensile force. This thereby provides an alignment means suitable for use between hose segments which aligns the axis of juxtapositioning to a tensile force generated between the nozzle and the anchored piping during a drive-off, at the point at which the first body member is releasably held to the second body member, in response to such tensile force.

Figure 12:
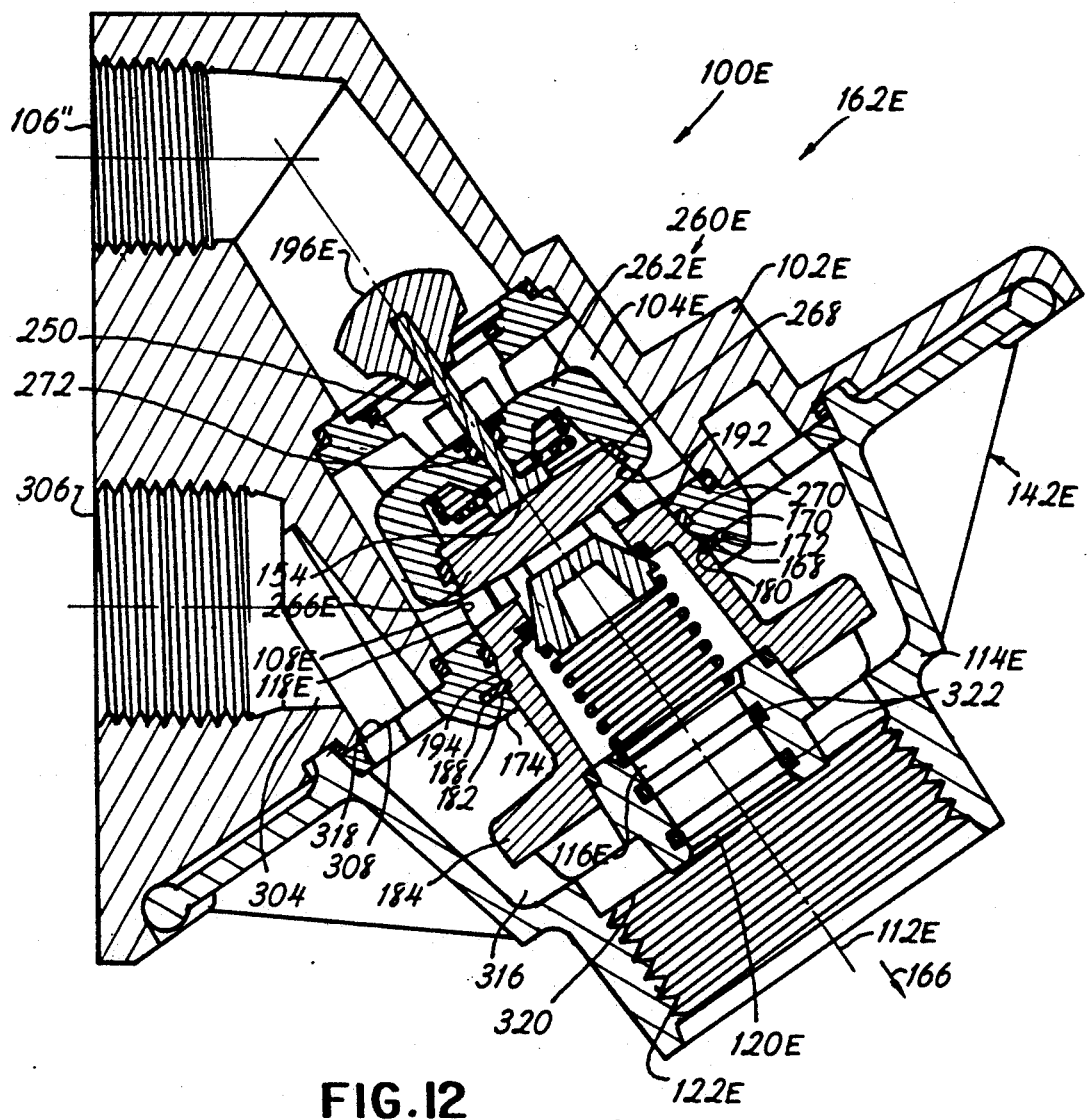
FIG. 12 is an axial cross-sectional view of another embodiment of the improved breakaway coupling.

An alignment means 142B in FIG. 6 and 142E in FIG. 12 is provided for aligning the axis of juxtapositioning 112 of devices included between the anchored piping 22 and a hose. In the preferred embodiment, the alignment means 142B includes a first body member 102B having a fluid passage 104 therethrough with an inlet 106 to said fluid passage 104 having a male thread 110B suitable for being directly engaged with the anchored piping 22 and held in fluid communication with such piping 22. The first acting body member 102B is further designed to retentively abut the toroidal flange rim 152 of the second acting body member 114B having a fluid passage 116 therethrough which is axially juxtapositioned to and held in fluid communication with the fluid passage 104 of the first body member 102B. The fluid passage 116 through second body member 114B terminates at an outlet 120 with a female thread 122 suitable for being attached in fluid communication with one end of a standard flexible hose; the other end of which is attached to a nozzle 34.

When a tensile force is exerted on the connected hose in direction 166, which is parallel to the axis of juxtapositioning 112, that tensile force vector acts at a point 144 on the axis of juxtapositioning 112 at which the first body member 102B is releasably held to the second body member 114B in direction 166. When a tensile force is exerted on the connected hose in direction 154 the second acting body member 114B, rotating about the center 156 at rim 152 which is retentively located at the compressive interface 158 with the first acting body member 102B, converts the rotational force vector to an axial force vector in direction 166 at point 144 on axis 112. This thereby provides an alignment means suitable for direct attachment between the anchored piping and a hose which aligns the axis of juxtapositioning to a tensile force generated between the nozzle and the anchored piping during a drive-off, at the point at which the first body member is releasably held to the second body member, in response to such tensile force.

An alignment means 142C in FIG. 8 is provided for aligning the axis of juxtapositioning 112 of a device included between a hose and the nozzle 34. In the preferred embodiment, the alignment means 142C includes a first body member 102C having a fluid passage 104 therethrough with an inlet 106 to said fluid passage 104 having a female thread 110 suitable for being directly engaged with a hose and held in fluid communication thereto. The second body member 114C describes a fluid passage 116A, 116B and 116C therethrough which is axially juxtapositioned to and held in fluid communication with the fluid passage 104 of the first body member 102C. The second body member 114C comprises the previously described swivel mechanism including a receiving member 124 suitable for being axially juxtapositioned with the first body member 102C along axis 112 and flexingly held to the yoking member 132 along swivel axis 130. The yoking member 132 is rotatably juxtapositioned with the connecting member 134 along swivel axis 136. The connecting member 134 is adapted by conventional means such as a male thread 122C at the outlet 120C of the fluid passage to be attachable to the nozzle 34 and held in fluid communication therewith. The two swivel axes 130 and 136, which are not parallel, permit the inlet 102 attached to the hose to be positioned at some divergent angle and in any desired plane with respect to the nozzle 34 which may be engaged at the opening of the fuel tank 28 of a vehicle 30 during a drive-off. Alignment of the axis of juxtapositioning 112 is produced when the tensile force-loaded hose attached at inlet 106 urges the first body member 102C which is hingedly attached to a connected nozzle 34 by swivel axes 130 and 136 to align in response to such load. This thereby provides an alignment means suitable for direct attachment between a hose and a nozzle which aligns the axis of juxtapositioning to a tensile force generated between the nozzle and the anchored piping during a drive-off, at the point at which the first body member is releasably held to the second body member in response to such tensile force.

For all embodiments, detent means generally indicated at 162 or 162B are provided to couple the first body member 102, 102A, 102B or 102C and second body member 114, 114A, 114B or 114C together in flow communication and to uncouple them when a force in excess of a predetermined level is applied in the direction of uncoupling the first and second body members.

In the embodiments of the present design described in FIGS. 3, 5 and 8 the detent means 162 comprises a frangible member or members such as a shear pin 164 designed to withstand a predetermined threshold level of axial pull in direction 166 below the threshold level at which the shear pin 164 fractures. The shear pin 164 thus resists all tensile loads up to tile threshold limit which tend to move the releasable second body member 114, 114A or 114C, attached in some manner, to the nozzle 36, in direction 166 from axial engagement with the force resisting first body member 102, 102A or 102C, attached in some manner to the anchored piping 22. The shear pin 164 therefore holds the first body member 102, 102A or 102C axially juxtapositioned with the corresponding second body member 114, 114A or 114C. This thereby maintains the outlet 108 of the fluid passage 104 through the first body member 102, 102A or 102C in fluid communication with the inlet 118 of the fluid passage 116 through the second body member 114, 114A or 114C.

When a force in excess of the threshold limit occurs the releasable second body member 114, 114A or 114C moves in direction 166 from axial engagement with the force resisting first body member 102, 102A or 102C as the shearing of the shear pin 164 occurs. Subsequently, the second body member is moved axially in direction 166 in response to the continued exertion of such forces. This moves the outlet 108 of the fluid passage 104 through the first body member 102, 102A or 102C from fluid communication with the inlet 118 of the fluid passage 116 through the second body member 114, 114A or 114C. Further, the releasable second body member 114, 114A or 114C is moved from axial interface with the force resisting first body member 102, 102A or 102C.

This thereby releases the nozzle 34 from attachment and fluid communication with the anchored piping 22 in response to a tensile force in excess of a predetermined threshold level. This thereby provides a frangible release means suitable for coupling the first body member and second body member together in flow communication and to uncouple them when an extraneous axial force in excess of a predetermined level is applied along the axis of juxtapositioning.

Figure 10:
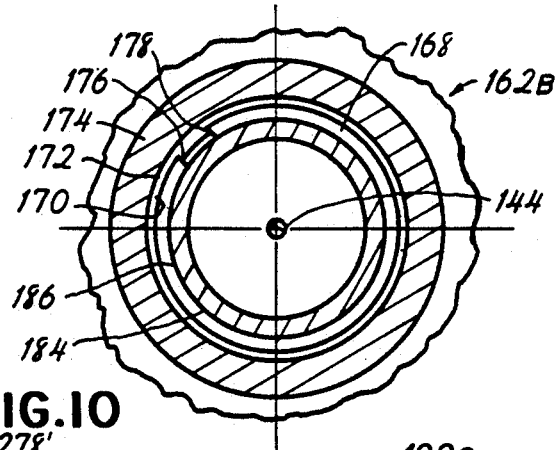
FIG. 10 is a cross-sectional view of the embodiment shown in FIG. 6, the cross-section being perpendicular to the axis and taken as shown in FIG. 6.

In alternate embodiments, an infrangible detent design, generally indicated at 162B in FIGS. 6, 9 and 10 and at 162E in FIG. 12, is provided. The detent means comprises a spring member 168 held in an annular recess 170 in the end portion 174 of the first body member 102B or 102E. The annular recess 170 is of sufficient size to accept an expanded spring member 168 totally therein and provide room 172 for spatial expansion of the spring means 168 when it is in a relaxed or preloaded condition. The spring member 168 may be of any cross sectional configuration including circular, rectangular, square or the like and be made of any convenient material. In the preferred embodiment, the cross sectional configuration of the spring member 168 is rectangular with rounded ends, a readily available configuration commonly used in the manufacture of retaining rings. The ends 176 and 178 of the flat circular spring 168 are trimmed so that the spring may lie in a flat plane in a relaxed condition. When the detent means 162B is engaged in the holding position the inner rounded edge 180 of the spring member 168 resides in an annular recess 182 in the end portion 184 of the second body member 114B or 114E with the spring in a state of preload. Further, the inner rounded edge 180 of spring member 168 is held against a camming surface portion 188 of the annular groove. The thus positioned spring member 168 resists forces which would tend to move the releasable second body member 114 in direction 166 from axial engagement with the force resisting first body member 102. When an axial force is exerted, sufficient to cause camming surface 188 acting against edge 180 to urge spring member 168 to expand into the space 172 in annular groove 170 and release engagement with end 184, the releasable second body member 114 or 114E is moved in direction 166 from axial engagement with the force resisting first body member 102. As the end 184 of the second body member 114B or 114E is withdrawn, the spring member 168 moves to a relaxed position 190 but is still retained within annular groove 170 in end 174 of the first body member 102B or 102E. This thereby provides an infrangible release means suitable for coupling the first body member and second body member together in flow communication and to uncouple them when an axial force in excess of a predetermined level is applied along the axis of juxtapositioning.

Means are also provided for recoupling the detent means 168. When uncoupled, the end 184 of the second body member 114B or 114E may be moved axially in a direction opposite direction 166 into engagement with end portion 174 of the first acting body member 102B. As engagement occurs, the tapered outer surface 192 of end 184 contacts the inner surface 180 of the spring member 170 which is in a relaxed position 190. As insertion continues, the outer surface 192, in contact with the inner surface 180 of spring member 168, cammingly urges spring member 168 into annular groove 170 until contact therebetween passes the apex 194 of the tapered surface at the juncture of such surface and annular groove 182. Further inserting movement of end 184 thereafter causes the spring member 168 to return to its engaged preloaded position. This thereby provides means for recoupling an infrangible detent means.

While the device depicted in FIGS. 6 and 12 includes the preferred embodiment of an infrangible detent means 162B and all other embodiments depicted are shown as including frangible detent means 162, in fact any of the embodiments may employ either a frangible or infrangible detent. Further these detent means may be of the type described or of any other type, including but not limited to the design described in U.S. Pat. No. 4,827,977.

Valving means, generally indicated at 196 in FIG. 3, 196A in FIG. 5, 196B in FIG. 6 and 196C in FIG. 8 are provided to terminate the flow of liquid from the fluid passages when the first body member 102, 102A, 102B and 102C releases from axial engagement with the second body member 114, 114A, 114B and 114C by the detent means 162 or 162B. The valve means are adapted by construction and configuration to seal the outlet 108 of the fluid passage 104 carrying pressurized liquid, pumped from remote location, through the first body member 102, 102A, 102B or 102C and thereby terminates the loss of pressurized liquid subsequent to said separation. Further, the valve means are adapted by construction and configuration to seal the inlet 118 of the fluid passage 116 of the second body member 114, 114A, 114B or 114C which is held in fluid communication with the nozzle 34 either directly or by means of intermediate conduit members when such conduit members contain in excess of one pint of liquid. The valving means is thereby adapted to terminate the loss of liquid therefrom in excess of one pint subsequent to the aforesaid separation.

More specifically, in the embodiment of the valving means generally indicated at 196 in FIG. 3, the first acting valve 198 adapted to act in the first acting body member 102 includes an exactly tapered sealing surface 200 suitable for being urged by some mechanism, such as a spring 202, against a correspondingly configured valve seat 204. When the first acting body member 102 and second acting body member 114 are axially juxtaposed and in fluid communication, the valve 198 is held from sealing contact with the valve seat 204 by the valve stem 206 which resides supported against the camming surfaces 208 and 210 of two detents 212 and 214. The detents 212 and 214 are held in this supporting position by a retentive interface and magnetism. The retentive interface occurs between the rounded heel portion 216 and 218 respectively of the detents 212 and 214 which are prevented from movement away from axis 112 by the annular groove 220. However, this annular groove 220 is so formed as to allow the detents 212 and 214 to rotate about this contact outward to the positions described at 212' and 214' at which position the valve stem 206 would be released, thereby allowing the valve 198 to close sealingly against the seat 204. The thus described rotative movement of the detents 212 and 214 to the positions described at 212' and 214' is prevented by magnetic attraction between the ferrous detents 212 and 214 and a magnet 222 held by some means such as an adhesive in the second acting body member 114. When the second acting body member 114 is moved from axial juxtaposition with the first body member 102, the detents 212 and 214 are no longer held in the position shown in FIG. 3 by the magnet 222. Then the stem 206 acts to cam the detents 212 and 214 to the position described at 212' and 214' thereby allowing the valve 198 to close.

A second acting check valve 224, adapted to act within the second acting body member 114 includes an exact tapered sealing surface 226 suitable for being urged by some mechanism, such as a spring 228 against a correspondingly configured valve seat 230. When the first acting body 102 and second acting body 114 are axially juxtaposed and in fluid communication the pressurized fluid passing from the inlet 118 to the outlet 120 of the fluid passage 116 in direction 232 overcomes the urging of the spring 228 and opens the check valve 224 momentarily, allowing liquid to flow. When the pressurized flow is terminated the check valve 224 closes and seals the passage, thereby preventing leakage. This thereby provides independently operating valve means for sealing the fluid passages to prevent loss of fluid when the first and second body members are moved from axial juxtaposition.

In another embodiment of the preferred valving means generally indicated at 196A in FIG. 5 and 196B in FIG. 6, mutually opposing valves 234 and 236 each include a sealing surface 238 or 240 of some elastomeric material suitable for being urged by some mechanism, such as a spring 242 or 244 against a valve seat 246 or 248. When the first body member 102A or 102B and second body member 114A or 114B are axially juxtaposed and in fluid communication, the valves 234 and 236 are supported in the open position by valve stems 250 and 252 which are fixedly held in opposing contact at interface 254 by the urging of springs 242 and 244. When the second acting body member 114A or 114B is moved from axial juxtaposition with the first acting body member 102A or 102B the valve stems 250 and 252 are no longer fixedly held in position by opposition and the valves 234 and 236, urged by springs 242 and 244 move closed until the sealing surfaces 238 and 240 move into sealed contact with the valve seats 248 and 250. This thereby provides opposing valve means for sealing the fluid passages to prevent loss of fluid when the first and second body members are moved from axial juxtaposition.

In a further embodiment of the valving means generally indicated at 196C in FIG. 8, a valve means, suitable for operating in the special condition of placement in close proximity to a nozzle, is provided. As previously described, the device shown in FIG. 8 is adapted to attach directly to a nozzle, the combined fluid passages of the device and nozzle does not generally contain one pint of liquid and therefore not required to be sealed during a drive-off. Therefore, only one valve is employed. The valve 234' includes a sealing surface 238' of some elastomeric material suitable for being urged by some mechanism, such as a spring 242' against a valve seat 246'. When the first acting body member 102C and second acting body member 114C are axially juxtaposed and in fluid communication, the valve 234' urged by spring 242' is supported in the open position by a valve stem 250' which is held in opposing contact at interface 254' against the receiving member 124 portion of the second acting body member 114C. When the second acting body member 114C is moved from the axial juxtaposition with the first acting body member 102C the valve stem 250' is urged by spring 242' closed until the sealing surface 238' is moved into sealed contact with the valve seat 248'. This thereby provides a single valve means for mounting in close proximity to a nozzle and sealing the fluid passage from the metering equipment to prevent loss of fluid when the first and second body members are moved from axial juxtaposition.

Many of the elements of the present design are well-known and are not claimed independently. However, many of these various elements may be combined so as to be is within the scope of this design, and it is intended to include all variations of these elements used in conjunction with the axial shock limiting means which is herein described.

Means generally indicated at 260, 260A, 260B, 260C or 260E in FIGS. 3, 5, 6, 8 and 12 are provided to partially or totally hydrostatically isolate the axial interface of the fluid passages through the first body member 102, 102A, 102B, 102C or 102E and the second body member 114, 114A, 114B, 114C or 114E and thereby limit or prevent the pressurized fluid contained in the passages from producing decoupling axial forces. This thereby prevents line shock from adversely affecting axially juxtaposed breakaway couplings.

More specifically, in the preferred embodiment of the hydrostatic isolation means generally indicated at 260 in FIGS. 3 and 4 is provided, wherein the fluid passage 104 through the first body member 102 is diverted about a partition 262. The partition 262 is attached by some means such as spokes 264 to the first body member 102. The partition 262 forms the axial terminus of the first body member at the axially juxtapositioned interface thereof with the second body member 114. Additionally, the fluid passage 116 throught the second body member 114 is diverted about a partition 266 attached by some means such as spokes 272 to the second body member 114. The partition 266 forms the axial terminus of the second body member 114 at the axially juxtapositioned interface with the first body member 102. A conventional sealing means 268 such as an "O" ring is provided to seal the interface of the partitions 262 and 266. Preferably, the seal 268 is located at or near the outermost portion of the male member at the interface and prevents compressed liquids from the fluid passages 104 and 116 from entering between the interface of the partitions 262 and 266 which is the axial interface of the first and second body members. This prevents the generating of hydrostatically produced axially directed forces which would tend to move the second acting body member 114 in direction 166 from axial juxtaposition with thr first acting body member 102 when the fluid passages are pressurized.

An outer seal 270 which may also be a conventional "O" ring is provided at the interface of the first acting body member 102 and second acting body member 114. The second seal 270 is positioned to prevent the compressed liquids in the fluid passages 104 and 116 from leaking to the atmosphere during normal operation. Since, in the preferred embodiment 260 the sealing diameter of seal 268 is the same as the sealing diameter 270, hydrostatic fluids contained between the seals 268 and 270 produce no net axial force. This arrangement provides means to prevent the pressurized liquid contained in the fluid passages from entering between the first and second body members at the axial interface thereof, thus preventing hydrostatically produced axial forces, generated by pressurization of such fluid passages, from causing the release means to uncouple. Consequently, this arrangement prevents line shock from adversely affecting axially juxtaposed breakaway couplings.

The just described preferred embodiment of the hydrostatic isolation means 260 in FIGS. 3 and 4 produces no net hydrostatically-generated axially directed force between the juxtapositioned first body member 102 and second body member 114. However, the magnetically operated valving means 196 which may be required to produce this total elimination of an axial force vector may not be economically practical. Further, it may be desirable to utilize opposing valving means such as is shown at 196A in FIG. 5, which is suitable for being reassembled in the field. Further, it may not be necessary to eliminate all of the hydrostatically produced axial force vector. Instead, it may only be necessary to eliminate that portion of the force vector which adversely effects the detent. To satisfy these requirements, the embodiment of the hydrostatic isolation means generally indicated at 260A in FIG. 5 is provided which is suitable for use with opposing valve means 196A.

In an alternate embodiment of the hydrostatic isolation means generally indicated at 260A in FIG. 5, means suitable for operating with opposing valving are provided, wherein the fluid passage 104 through the first body member 102A is diverted about a partition 262A attached by some means such as spokes to the first body member 102A. The partition 262A forms the axial terminus of the first body member 102A at the axially juxtapositioned interface thereof with the second body member 114A. The fluid passage 116 through the second body member 114A is diverted about a partition 266A attached by some means such as spokes to the second body member 114A. The partition 266A forms the axial terminus of the second body member 114A at the axially juxtapositioned interface with the first body member 102A. The valve stem portions 250 and 252 of opposing valve means 196A penetrate through the partitions 262A and 266A and align and abut at interface 154. A conventional sealing means 268 such as an "O" ring is provided to seal the interface of the partitions 262A and 266A. The seal 268 is located at or near the outermost portion of the male member at the interface. Additional conventional sealing means 272 and 274 which also may be "O" rings are positioned to seal the penetration of valve stem 250 at the point it passes through partition 262A and at the penetration of valve stem 252 at the point it passes through partition 266A. This prevents compressed liquids in the fluid passages 104 and 116 from entering between the interface of the partitions 262A and 266A which is the axial interface of the first and second body members. This prevents the generating of hydrostatically produced axially directed forces which would tend to move the second acting body member 114A in direction 166 from axial juxtaposition with the first acting body member 102A when the fluid passages are pressurized. In addition, the outer seal 270 is positioned to provide a containment seal at the axial interface of the first acting body member 102A and second acting body member 114A. As previously described, this prevents the compressed liquids in the fluid passages 104 and 116 from leaking.

Hydrostatically-generated axially-directed forces are maintained at a tolerably low level in these arrangements. In the preferred embodiment of this design, the valve stems are very small in diameter. One prototype design used valve stems approximately 0.093 inches in diameter, yielding a cross-sectional area of the valve stems on which hydrostatic forces acted to generate an axially-directed force of only about 0.00068 square inches. Even when this small area was subjected to extremely high line shock pressures of about 600 Psig., an axial force of only about 4 pounds was generated. Since the sealing diameter of inner seal 268 is the same as the sealing diameter of the outer seal 270, hydrostatic pressure contained between the seals 268 and 270 produce no net axial force at this location. This therefore provides means to prevent the pressurized liquid contained in the fluid passages from entering between the first and second body members at the axial interface thereof, thus preventing hydrostatically- produced axial forces, generated by pressurization of such fluid passages, from causing the release means to uncouple which thereby prevents line shock from adversely affecting axially juxtaposed breakaway couplings.

In certain embodiments such as those described in FIGS. 6, 8 and 12, it may be preferable not only to have opposing valves but also to have a tapered interface at the axial juxtaposition between the first and second body members. In the device of FIG. 6, for instance, it is necessary for the juxtapositioned male portion 276 of the second action body member 102B to clear, without interference, the corresponding female portion 278 of the first acting body member 102B when separation of the body members 102B and 114B occurs as the second acting body member 114B rotates about center 156 on the flange rim 152. For this to occur properly, the male 276 and female 278 portions must either, be curved with the same radius of curvature or in some other way be tapered to provide clearance.

Similarly, because of frictional forces at the swivel axes 130 and 136, the device of FIG. 8 may not always perfectly align the axis of juxtaposition 112 with a tensile force exerted through a hose connected to inlet 106. To compensate for potential incomplete alignment it may be desirable to taper the juxtapositioned male portion 276' of the first body member 102C and corresponding female portion 278' of the second body member 114C. This tapering deters the axially juxtaposed members from binding against one another during disengagement.

While tapered juxtapositioned surfaces are desirable at times, in the present design this results in a hydraulically-produced force vector problem. Specifically, a minimum of two conventional sealing means 268 and 270, held in the female portion 278 or 278' are required to act sealingly against the male portion 276 or 276'. The first inner seal 268 prevents pressurized liquid from entering the area of axial interface between the partitions 262B or 262C and 266B or 266C of the first and second body members. The second outer seal 270 prevents leakage to the atmosphere from the pressurized fluid passages 104 and 116 when the first and second body members are axially juxtapositioned. Since the two seals 268 and 270 define the limit of the fluid passages they are at some distance from one another and seal against a tapered surface. Therefore, the seals have different sealing diameters. This differential of seal diameters confining a pressurized liquid produces an axial force vector- which must be kept within allowable limits.

Hydrostatic isolation means, generally indicated at 260B, 260C and 260E in FIGS. 6, 8 and 12, are provided suitable for preventing the pressurized fluid contained in the fluid passages from producing decoupling axial forces. Specifically, the fluid passage 104 through the first body member 102B, 102C or 102E is diverted about a partition 262B, 262C or 262E attached by some means such as spokes to the first body member 102B, 102C or 102E. The partition 262B, 262C or 262E forms the axial terminus of the first body member at the axially juxtapositioned interface thereof with the second body member 114B, 114C or 114E. The fluid passage 116 through the second body member 114B, 114C or 114E is diverted about a partition 266B, 266C or 266E attached be some means such as spokes to the second body member 114B, 114C or 114E. The partition 266B, 266C or 266E forms the axial terminus of the axis of juxtaposition 112 with the second body member 114B, 114C or 114E. The valve stem portions 252 and/or 250 of opposing valve means 196B, 196C or 196E penetrate through the partitions 262B, 262C or 262E and/or through the partitions 266B and 266C and positioningly abut at interface 154. A conventional sealing means 268 is provided to seal the interface of the partitions 262B, 262C or 262E and 266B, 266C or 266E. Preferably, the seal 268 is located at or near the outermost portion of the male member at the interface. Additional conventional sealing means 274 and/or 272 are positioned to seal the penetration of valve stem 250 at the point it passes through partition 262B, 262C or 262E and, if two valves are used, at the penetration of valve stem 252 at the point it passes through partition 266B. This prevents compressed liquids in the fluid passages 104 and 116 from entering between the interface of the partitions 262B, 262C or 262E and 266B, 266C or 266E, which is the axial interface of the first and second body members. This prevents the generating of hydrostatically-produced axially-directed forces which would tend to move the second acting body member 114B, 114C or 114E in direction 166 from axial juxtaposition with the first acting body member 102B, 102C or 102E when the fluid passages are pressurized. In addition, the outer seal 270 is positioned to produce a containment seal at the tapered axial interface of the first acting body member 102B, 102C or 102E and second acting body member 114B, 114C or 114E. As previously described, this prevents the compressed liquids in the fluid passages 104 and 116 from leaking.

Figure 7:
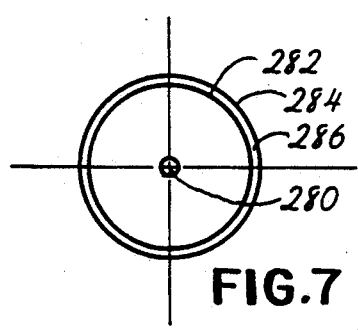
FIG. 7 is a diagram of areas of fluid communication in FIG. 6.

Hydrostatically generated axially directed force vectors are maintained at a tolerably low level. In the preferred embodiment of this design the valve stems are very small in diameter as described in detail above. The relevant areas are illustrated in FIG. 7. Typically, the valve stems 250 and 252 have a cross sectional area of only about 0.00068 square inches as graphically indicated at 280 in FIG. 7. The inner seal 268 seals against the male portion 276 or 276' at diameter 282 which, in a working prototype, is 1.000 inches in diameter and therefore has a cross sectional area of about 0.78540 square inches. The outer seal 270 seals against the male portion 276 or 276' at diameter 284 which, in a working prototype, is about 1.062 inches in diameter and therefore has a cross-sectional area of about 0.88581 square inches. The differential in the cross sectional areas at the seals in the exemplary prototype which produces axial forces is approximately 0.10041 square inches as indicated at 286. Since the area described by 280 develops net axial forces in the same direction as the area described at 286, the net hydrostatically produced force is equal to the sum of these areas, which is about 0.10720 square inches in an exemplary prototype, multiplied by the hydrostatic pressure. At a normal maximum operating pressure of 50 Psig. this produces only about 5.3 pounds of net axial force, which is less than a typical frictional resistance to movement at the seals. Even when this area is subjected to extreme line shock pressures of 600 Psig. an axial force of only about 64.3 pounds is generated. This approximately 65 pounds of net axial force is significantly less than the 200 pounds allowable under the various safety codes in the United States of America and is therefore unlikely to produce separation of the detent. This therefore provides means to prevent the pressurized liquid contained in the fluid passages from entering between the first and second body members at the axial interface thereof, thus preventing hydrostatically produced axial forces, generated by pressurization of such fluid passages, from causing the release means to uncouple which thereby prevents line shock from adversely affecting axially juxtaposed breakaway couplings.

A yet further embodiment of the present design for preventing hydraulically generated axial forces from adversely affecting a breakaway coupling are provided as generally indicated at 100D in the schematic representation of a device shown in FIG. 11 and at 100E in FIG. 12. The alternate embodiment represented at 100D or 100E are suitable for use with breakaway couplings having a plurality of passages therethrough which allows such devices to be used with one fluid passage coaxially aligned within a second vapor return passage, such as are commonly used in vapor recovery units; the device shown in FIG. 11 is also suitable for use with multiple pressurized fluid passages, such as are employed in blended gasoline dispensers, and with multiple pressurized fluid passages and one or more vapor return passage, such as are employed in vapor recovery blended gasoline dispensers.

The apparatus includes a first body member 102D or 102E describing a first fluid passage 104D or 104E therethrough from an inlet 106" to an outlet 108D or 108E. The first body member 102D or 102E also describes one or more additional passage(s) 304 therethrough from an inlet 306 to an outlet 308. The passage(s) 304 may be positioned coaxially parallel or, in some other arrangement to the first fluid passage 104D or 104E and may be adapted to convey fluids or gases. The inlets 106E and 306 which may be coaxially or independently located are adapted by conventional means such as seals 310 and/or threading 110D or 110E and 110E' to be attachable to the anchored piping 22 of the dispenser and held in fluid communication therewith, either by means of one or more intermediate members such as one or more flexible hose segment(s) 24, as for the device of FIG. 11, or directly. The device of FIG. 12, like that of FIG. 6, may be attached directly to the pump housing. The threads 110D or 110E may be male or female. The outlet 108D or 108E of the first fluid passage 104D or 104E to the interface of an axially juxtapositioned corresponding member at some angle to the axis 112D or 112E of juxtapositioning and at a location other than the axial terminus of said interface. The outlet 308 of the additional passage(s) 304 may be similarly prepared if such passages convey pressurized material which could produce axially directed forces or not, as illustrated in the schematic representation of FIG. 11, if such additional passage(s) 304 is/are not pressurized.

A second body member 114D or 114E is provided suitable for being axially juxtapositioned with the first body member 102D or 102E along axis 112D or 112E, which is the axis of engagement. The second body member 114D or 114E describes a first fluid passage 116D or 116E therethrough from an inlet 118D or 118E to an outlet 120D or 120E. The inlet 118D or 118E is juxtapositioned in fluid communication with the outlet 108D or 108E of the first fluid passage 104D or 104E of the first body member 102D or 102E. The inlet 118D or 118E of the first fluid passage 116D or 116E is positioned to receive the fluid discharged by said outlet 108E or 108E at some angle to the axis 112D or 112E of juxtapositioning and at a location other than the axial terminus of the interface between the first body member 102D or 102E and the second body member 114D or 114E. The second body member 114E or 114D also describes one or more additional passage(s) 316 therethrough from an inlet 318 to an outlet 320. The passage(s) 316 may be positioned coaxially parallel or in some other arrangement relative to the first fluid passage 116D or 116E and may be adapted to convey fluids or gases. The inlet 318 of the additional passage(s) 316 may be similarly prepared to inlet 118D or 118E if such passage(s) 316 conveys pressurized material which could produce axially directed forces or not, as illustrated in the schematic representation of FIG. 11, if such additional passage(s) 304 is/are not pressurized. The outlets 120D or 120E and 320 of passages 116D or 116E and 316 which may be coaxially or independently located are adapted by conventional means such as seals 322 and/or threading 122D or 122E to be attachable to the nozzle 34 and held in fluid communication therewith, either directly or by means or one or more intermediate members such as one or more flexible hose segment(s) 24. This therefore provides an axial engagement means for juxtapositioning body members, having a fluid passage therethrough, in fluid communication, said body members being connected intermediate a piping system and a nozzle and attachable thereto and held thereby in fluid communication therewith.

Alignment means generally indicated at 142D in FIG. 11 and 142E in FIG. 12. The alignment means 142E is like that described above for the device of FIG. 6. Alignment means are provided to align the axis of juxtapositioning 112D or 112E with the direction of tensile pull at the point at which the first body member 102D or 102E is releasably held to the second body member 114D and 114E. The configuration of the schematically represented first body member 106D and second body member 114D in FIG. 11 bears a graphic resemblance to the embodiments described at 100 and 100A in FIGS. 3 and 5, however, the configuration is only schematic and may thereby represent the configurations described at 100B or 100C in FIGS. 6 or 8. As previously described, each of these embodiments 100, 100A, 100B and 100C includes an alignment means which is specific to its configuration and use. This thereby provides an alignment means suitable for use between hose segments which aligns the axis of juxtapositioning to a tensile force generated between the nozzle and the anchored piping during a drive-off, at the point at which the first body member is releasably held to the second body member, in response to such tensile force.

Detent means generally indicated at 162D and 162E are provided to couple the first body member 102D or 102E and second body member 114D or 114E together in flow communication and to uncouple them when a force in excess of a predetermined level is applied in the direction of uncoupling the first and second body members. The detent means 162E of FIG. 12 is like that of FIG. 6, and the detent means 162D of FIG. 11 schematically represents any detent means and should be taken to comprise the previously described frangible member or members such as a shear pin 164 in FIGS. 3, 5 and 8 or, an infrangible detent design, such as that represented at 162B, 162C, 162D or 162E in FIGS. 6, 9 and 10 and FIG. 12. This thereby provides a release means suitable for coupling the first body member and second body member together in flow communication and to uncouple them when an extraneous axial force in excess of a predetermined level is applied along the axis of juxtapositioning.

Valving means, generally indicated at 196D in FIG. 11 and at 196E in FIG. 12 are provided to terminate the flow of liquid from the fluid passages when the first body member 102D or 102E is released from axial engagement with the second body member 114D or 114E by the detent means 162D or 16E2. The valve means are adapted by construction and configuration to seal the outlet 108D or 108E of the first fluid passage 104D or 104E carrying pressurized liquid, pumped from a remote location, through the first body member 102D or 102E and thereby terminate the loss of pressurized liquid subsequent to said separation. In the event that the additional passage(s) 304 is/are designed or intended to be pressurized or contain liquid or other matter whose release it is desirable to prevent, similar valve means (not shown) may be used at the terminus of such passage and act sealingly when the body members are axially disengaged. Further, the valve means are adapted by construction and configuration to seal the inlet 118D or 118E of the first fluid passage 116D or 116E of the second body member 114D or 114E which is held in fluid communication with the nozzle 34 either directly or by means of intermediate conduit members when such conduit members contain in excess of one pint of liquid. In the even-'L the additional passage(s) 316 is-/are designed to be pressurized or contain liquid or other matter whose release it is desirable to prevent, similar valve means (not shown) may be used at the terminus of such passage and act sealingly when the body members are axially disengaged. The valving means may be of any suitable type or construction such as the previously described embodiments depicted at 196 in FIG. 3, 196A in FIG. 5, 196B in FIG. 6, 196C in FIG. 8, or 196E in FIG. 12, or they may be of any other design. This thereby provides valve means for sealing the fluid passages to prevent loss of fluid when the first and second body members are moved from axial juxtaposition.

Means generally indicated at 260D in FIG. 11 and 260E in FIG. 12 are provided to partially or totally hydrostatically isolate the axial interface of the fluid passages through the first body member 102D or 102E and the second body member 114D or 114E and thereby limit or prevent the pressurized fluid contained in the passages from producing decoupling axial forces. The hydrostatic isolation means 260D or 260E are represented schematically and may comprise any of the previously described means indicated at 260 in FIG. 3, 260A in FIG. 5, 260B in FIG. 6 or 260C in FIG. 7. This therefore provides means to prevent the pressurized liquid contained in the fluid passages from entering between the first and second body members at the axial interface thereof, thus preventing hydrostatically produced axial forces, generated by pressurization of such fluid passages, from causing the release means to uncouple which thereby prevents line shock from adversely affecting axially juxtaposed breakaway couplings.

While several embodiments of the present design have been detailed and described, many other such embodiments will become apparent to those skilled in the art. It is therefore the intent of this application to include all such variations within the subject matter claimed.

I claim:

1. An improved breakaway coupling suitable for use intermediate a piping system or reservoir and a nozzle and in fluid communication therewith at a fuel dispensing station, said coupling comprising:
   a first body member with a fluid passage therethrough in sealed fluid communication with a fluid passage through a second body member;
   axial engagement means for juxtapositioning said body members;
   outer sealing means at the interface of the first and second body members to maintain such body members in fluid communication and prevent pressurized liquid contained in said fluid passages from leaking therefrom;
   inner sealing means to prevent pressurized liquid contained in said fluid passages from entering between said first and second body members at the axial interface between said first and second body members, thereby preventing pressurized fluid in the passages from exerting hydrostatic forces between the body members, which forces act to uncouple the release means;
   release means suitable for coupling the first body member and second body member together in flow communication and for uncoupling them when a force in excess of a predetermined level is exerted along the axis of juxtapositioning;
   alignment means which aligns the axis of juxtapositioning with the component of tensile force on the breakaway coupling, said alignment means aligning said axis of juxtapositioning and said force component at the point at which the first body member is releasably held to the second body member; and
   valving means for sealing the fluid passages against loss of fluid when the release means releases the first and second body members from axial juxtaposition.

2. The device of claim 1 wherein the device is suitable for and has means for direct connection to the anchored piping in a fuel dispensing station and has means for connection to a flexible hose attached to a nozzle.

3. The device of claim 1 wherein the device is suitable for and contains means for interconnection between flexible hose segments attached to the anchored piping in a fuel dispensing station and a nozzle.

4. The device of claim I wherein the device is suitable for and contains means for interconnection between a flexible hose attached to the anchored piping in a fuel dispensing station and a nozzle.

5. The device of claim 1 wherein the release means is frangible.

6. The device of claim 1 wherein the release means is recouplable.

7. The device of claim 1 wherein the means to prevent the pressurized liquid contained in said fluid passages from entering between the first and second body members at the axial interface thereof prevents the generation of all axial forces produced by pressurization of such fluid passages.

8. The device of claim 1 wherein the means to prevent the pressurized liquid contained in the fluid passages from entering between the first and second body members at the axial interface thereof prevents the generation of axial forces produced by pressurization of such fluid passages of a magnitude sufficient to cause the release means to uncouple.

9. The device of claim 1 wherein said first body member and said second body member each contain one or more additional fluid passages therethrough, said additional fluid passage or passages of the first body member being in fluid communication with the corresponding fluid passage or passages of the second body member.

10. The device of claim 9 wherein said additional fluid passages are provided with valving means for sealing said additional fluid passages when the release means releases the first and second body members from axial juxtaposition.

11. The device of claim 9 wherein means are provided to prevent pressurized liquid contained in said additional fluid passages from entering between said first and second body members at the axial interface between said first and second body members.

* * * * *